Patented Mar. 3, 1925.

1,528,394

UNITED STATES PATENT OFFICE.

FRED K. BEZZENBERGER, OF EAST CLEVELAND, OHIO, ASSIGNOR TO RAY S. GEHR, TRUSTEE, OF CLEVELAND, OHIO.

ANTIMONY SULPHURETS MIXTURE AND PROCESS OF MAKING SAME.

No Drawing.   Application filed October 23, 1922. Serial No. 596,520.

*To all whom it may concern:*

Be it known that I, FRED K. BEZZENBERGER, a citizen of the United States, residing at East Cleveland, in the county of Cuyahoga and State of Ohio, have invented certain new and useful Improvements in Antimony Sulphurets Mixture and Processes of Making Same, of which the following is a specification.

The invention relates to rubber vulcanizing agents and a process of producing them, and it has to do more particularly with that type of vulcanizing agents which consists of mixtures of antimony pentasulphide, free sulphur and a mechanical filler or loader. These latter vulcanizing agents are commonly known in the trade as antimony sulphurets or golden antimony.

The present application constitutes in part a continuation of my earlier filed application, Serial No. 544,366, relating to the same invention.

One of the objects of the present invention is the production of a vulcanizing agent of the character in question having a filler characterized by (*a*) an exceedingly small and relatively uniform particle size, and (*b*) freedom from change of its physical state under all vulcanizing conditions.

Another object of the invention is the production of a vulcanizing agent of the class in question characterized by great uniformity of composition.

In the manufacture of my improved product I preferably make use of the following process: Taking sulphur flowers and stibnite ($Sb_2S_3$), I dissolve them in a strong solution of sodium sulphide in the proportions called for by the following reactions:

(1) $3Na_2S + 2S + Sb_2S_3 = 2Na_3SbS_4$
(2) $Na_2S + 2S = Na_2S_3$

These reactions are carried out by boiling the solution for about one hour. The solution is then diluted to such an extent that no crystallization will take place on cooling to room temperature and is then allowed to stand several hours to permit agglomeration and settling out of impurities consisting chiefly of ferrous sulphide. The clear liquid is then drawn off and run into an acid solution capable of reacting with the sodium thioantimonate and the sodium polysulphide to form antimony pentasulphide, sulphur, hydrogen sulphide and a soluble sodium salt. Any one of the three mineral acids, sulphuric, nitric and hydrochloric, and also other acids such as acetic will serve this purpose. It is to be noted, however, that nitric acid, or any strongly oxidizing acid, must be used in suitably diluted form. Of all the usable acids, I prefer one of the mineral acids and especially sulphuric acid on account of its low cost. Thus in the preferred procedure the clear solution of sodium thioantimonate and sodium polysulphide is run into an excess of dilute sulphuric acid at a preferable temperature of about 20° C., whereupon the following reactions take place:

(3) $2Na_3SbS_4 + 3H_2SO_4 =$
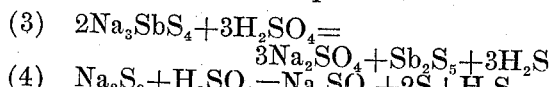
$3Na_2SO_4 + Sb_2S_5 + 3H_2S$
(4) $Na_2S_3 + H_2SO_4 = Na_2SO_4 + 2S + H_2S$ As a result of these last two reactions antimony pentasulphide and free sulphur are thrown down together as precipitates, the sodium sulphate is held in solution and the hydrogen sulphide is evolved as a gas. Preferably the hydrogen sulphide values are recovered by passing the gas through towers containing caustic soda to form sodium sulphide for use in the first part of the process.

The precipitate of antimony pentasulphide and sulphur is now washed free from soluble salts by decantation or on a filter, as is most convenient or economical under the cirmumstances. In either case the result is an intimate mixture of antimony sulphide and precipitated sulphur in sludge form.

Meanwhile I separately prepare the mechanical filler in the form of a finely divided carbonate of a metal of the alkaline earth group, and I preferably employ calcium carbonate. Such calcium carbonate can be prepared in different ways but I have secured the purest product and the smallest particle size by following the preferred procedure which I will now describe.

Substantially saturated equi-molal solutions of soda ash and calcium chloride are mixed together at a temperature ranging between 34° C. and 45° C. and preferably between 35° C. and 37° C. The solutions are brought together as quickly as possible and stirred vigorously for about 10 minutes after mixing. Then, while still stirring, water is turned into the mass to bring the volume to about 5 times the volume of the mixed solutions. Under the conditions specified calcium carbonate is precipitated in particles that are exceedingly small and relatively uniform as to size. By turning water into the solution and largely increasing its volume as specified the exceedingly small particles of the precipitate are separated and homogenous suspension is secured. The calcium carbonate thus formed in suspension is next allowed to settle and is then washed, either by decantation or on the filter, free from chlorides thus leaving it in the form of a sludge. In the mixing of the calcium chloride and soda ash solutions the former is turned into the latter and is preferably used in slight excess inasmuch as the chloride washes out from the precipitate more thoroughly than the alkali carbonate and it is important that the precipitate be free from alkalinity to avoid affecting the color value of the final product. The amounts of chloride and soda ash used are determined, of course, by the carbonate content desired in the final product.

The two sludges produced as above described are now thoroughly mixed together and the mixture filtered and dried. The dried product is then pulverized, preferably by passing it through a pulverizer of the air separation type, and is then ready for use. It should be understood that I use the term "sludge" in a broad sense indicating any water mixture of the material in question and do not intend to indicate by it any particular consistency. The sludge can be made with any amount of water that will effect an intimate mixture of the materials to be brought together. The more water one uses, the more readily such mixture is effected. Furthermore, if one of the materials to be mixed, the pentasulphide-sulphur material, for example, is distributed through a rather large volume of water, the mixture in sludge form can be effected by gradually adding to said volume the other material in dry form, with vigorous agitation of the liquid meanwhile. As a general rule, however, I prefer to have each of the two materials in sludge form before bringing them together. In whatever way the sludge mixture is formed care should be had to insure the intimate mixture of the materials when dried.

The antimony sulphuret prepared in accordance with my improved process is distinguished from prior products of this class in that it conforms very closely to any desired and predetermined composition. This is because the reactions employed are definite, quantitive and subject to absolute control. Furthermore the composition of the product can be varied through a practically unlimited range of predetermined proportions of the three constituents. In addition the calcium carbonate filler is not only inert chemically under all the normal rubber vulcanizing conditions but, being free of water of crystallization, does not tend to change its physical state by liquefying or vaporizing under the action of the heat of vulcanization. Finally the calcium carbonate filler prepared as above described is characterized by an exceedingly small and relatively uniform particle size. In fact by my improved process I am enabled to produce the carbonate with an average particle size as small as 2 microns. Produced by any previously known process of precipitation calcium carbonate has particle sizes ranging from 15 microns upward.

From my investigations I believe that the exceedingly small particle size which I have secured is due to the very high concentration of the soda ash and chloride solutions saturated at a temperature of 34° C. to 37° C. While the somewhat wider range of temperature of 34° C. to 45° C. previously mentioned can be employed I prefer to work within the narrower specified limits of 35° C. to 37° C. for the following reasons. Between the latter limits, at 35.5° C., to be as exact as possible, the optimum condition as to concentration of the saturated solution occurs. That is to say solutions, saturated between 35° C. and 37° C. may be taken as substantially the maximum. In addition, it happens that 35° C. (95° F.) is a convenient economical temperature at which to operate, being about as high as ordinary room temperatures go in summer and still calling for a minimum cooling of the sodium carbonate and calcium chloride solutions which, to save time, are made by boiling.

As stated above the finely divided calcium carbonate can be prepared in other ways, and to further explain my invention I will here describe one other method which I have employed. Where calcium carbonate, in the form of a natural deposit or by-product of some chemical process, is available in a sufficiently pure state, I have found that it is possible to reduce it to a particle size nearly though not quite as small as that which I attain by the use of the process of air separation as commercially practiced. In pulverizers of the air separation type large volumes of air are blown through the pulverizing chamber and only particles which have been reduced to a given size are carried by the air currents from said chamber. Said air currents pass to a settling space or chamber from the bottom of which the pulverized material is drawn, while the air itself passes on into a chamber or chambers the walls of which are formed by fine mesh cloth through which the air escapes to the atmosphere. While the major part of the pulverized material separates from the air in the settling chambers, exceedingly fine particles do not there settle but remain in suspension and pass through into the cloth-walled chambers and are there separated from the air which passes through said walls. I have found that this last mentioned material is exceedingly fine and, as previously stated, in the case of calcium carbonate approaches in particle size the material which I prepare by the above described process of precipitation.

It is therefore to be understood that I do not limit my invention, in its broader aspects, to the preparation of the mechanical filler or loader by the precipitation process. It should be observed, however, that the availability of a sufficiently pure calcium carbonate in the natural state or as a by-product, is rare, while my improved precipitation process always can be depended upon to produce a practically chemically pure product of a minimum particle size.

In order that the procedure in carrying out my invention may be quite clearly understood I will here state the amounts of the various materials suitable for the production of a particular sulphuret. Let it be assumed that the percentage composition by weight of a desired antimony sulphuret is $$Sb_2S_5 - 37\%$$
$$S - 13\% \pm 0.5\%$$
$$CaCO_3 - 50\%$$

Then to produce 100 lbs. of the sulphuret, materials are used in the following amounts:

|  | Lbs. | Ozs. |
|---|---|---|
| Fused sodium sulphide (57½% $Na_2S$) | 65 | 4 |
| Sulphur flowers | 19 | 0 |
| Stibnite (97½% $Sb_2S_3$) | 32 | 0 |
| Water, 12 gallons. | | |

(After dissolving the sodium sulphide, sulphur and stibnite by boiling, the solution is diluted to 50 gallons, to settle.)

| | | |
|---|---|---|
| $H_2SO_4$ (93%) | 56 | 0 |
| Calcium chloride (71.4% $CaCl_2$) | 78 | 0 |
| Soda ash (98% $Na_2CO_3$) | 54 | 0 |

It will be understood that the dilution of the sodium sulphide, sulphur and stibnite solution to 50 gallons is for the purpose of avoiding crystallization when the solution is cooled to room temperature. It will also be clear that the composition of the sulphuret, as to the proportions of the three constituents can be varied at will through a practically unlimited range by use of suitable amounts of the raw materials.

The advantages attaching to my improved antimony sulphuret and process of making the same will be appreciated from the foregoing description by those familiar with materials of this kind and especially with the antimony sulphurets which have heretofore commonly been produced by what is known as the lime process. In the latter process lime, sulphur and stibnite are boiled together and then the final product is precipitated from the resulting solution by pouring it into dilute sulphuric acid. The reactions involved are complex and not well understood. They are not quantitative nor subject to close control. There is, too, a substantial loss of antimony. Finally, the calcium sulphate which is precipitated with the antimony pentasulphide and sulphur, serves as the mechanical filler of the final product and is in the form of crystals which widely vary in form and size, ranging in size up to 150 microns, and contain water of crystallization.

On the other hand with the sulphuret made by my process the composition can be so closely predetermined that it is not necessary for the rubber manufacturer to "doctor" or adjust the composition to compensate for variations, and a rubber stock is secured by use of my sulphuret having the superior qualities due to the inertness and exceedingly fine particle size of the mechanical filler.

While I prefer to prepare my improved sulphuret with calcium carbonate produced by my special precipitation method, and to follow the procedure as above detailed, it will be understood from the appended claims that my invention in its broader aspects is not limited to this precipitation method or to the use of calcium carbonate or to the precise procedure described.

What I claim is:

1. A vulcanizing agent comprising in combination an intimate mixture of antimony pentasulphide, precipitated free sulphur, and a carbonate of a metal of the alkaline earth group characterized by freedom from change of physical state under vulcanizing conditions and by a particle size of less than ten microns diameter.

2. A vulcanizing agent comprising in combination an intimate mixture of antimony pentasulphide, precipitated free sulphur, and a carbonate of a metal of the alkaline earth group characterized by freedom from change of physical state under vulcanizing conditions and by a particle size of less than five microns diameter.

3. A vulcanizing agent comprising in combination an intimate mixture of antimony pentasulphide, precipitated free sulphur, and carbonate of calcium having a particle size of less than five microns diameter.

4. A vulcanizing agent comprising in combination an intimate mixture of antimony pentasulphide, precipitated free sulphur, and a mechanical filler characterized by freedom from iron, from alkalinity and from change of physical state under vulcanizing conditions and by a particle size of less than five microns diameter.

5. The improved process of making vulcanizing agents of the character set forth comprising dissolving sulphur and stibnite in sodium sulphide solution to form a solution of sodium thioantimonate ($Na_3SbS_4$) and sodium polysulphide ($Na_2S_3$), mixing the latter solution with an acid to form a precipitate of antimony pentasulphide and sulphur, preparing a carbonate of a metal of the alkaline earth group with a particle size of less than ten microns diameter, effecting an intimate mixture of the last-named precipitate and said carbonate in sludge form, drying the resultant mixture, and pulverizing said mixture.

6. The improved process of making vulcanizing agents of the character set forth comprising dissolving sulphur and stibnite in sodium sulphide solution to form a solution of sodium thioantimonate ($Na_3SbS_4$) and sodium polysulphide ($Na_2S_3$), mixing the latter solution with an acid to form a precipitate of antimony pentasulphide and sulphur, preparing calcium carbonate with a particle size of less than ten microns diameter, effecting an intimate mixture of the last-named precipitate and said carbonate in sludge form, drying the resultant mixture, and pulverizing said mixture.

7. The improved process of making vulcanizing agents of the character set forth comprising dissolving sulphur and stibnite in sodium sulphide solution to form a solution of sodium thioantimonate ($Na_3SbS_4$) and sodium polysulphide ($Na_2S_3$), mixing the latter solution with an acid to form a precipitate of antimony pentasulphide and sulphur, precipitating a finely divided carbonate of a metal of the alkaline earth group by mixing solutions of soda ash and a salt of the metal, both substantially saturated at a temperature between 90° F. and 105° F., washing said precipitate, and mixing said precipitate of pentasulphide and sulphur and said carbonate in sludge form, drying the resultant mixture, and pulverizing said mixture.

8. The improved process of making vulcanized agents of the character set forth comprising dissolving sulphur and stibnite in sodium sulphide solution to form a solution of sodium thioantimonate ($Na_3SbS_4$) and sodium polysulphide ($Na_2S_3$), mixing the latter solution with an acid to form a precipitate of antimony pentasulphide and sulphur, precipitating finely divided carbonate of calcium by mixing solutions of soda ash and calcium chloride, both substantially saturated at a temperature between 96° F. and 100° F., washing said precipitate, mixing said precipitate of pentasulphide and sulphur and the carbonate in sludge form, drying the resultant mixture, and pulverizing said mixture.

9. The improved process of making vulcanizing agents of the character set forth comprising dissolving sulphur and stibnite in sodium sulphide solution to form a solution of sodium thio-antimonate ($Na_3SbS_4$) and sodium polysulphide ($Na_2S_3$), mixing the latter solution with an acid to form a precipitate of antimony pentasulphide and sulphur, preparing a mechanical filler characterized by freedom from iron, from alkalinity and from change of physical state under vulcanizing conditions and by a particle size of less than five microns diameter, effecting an intimate mixture of the last named precipitate and said mechanical filler in sludge form, drying the resultant mixture, and pulverizing said mixture.

In testimony whereof, I hereunto affix my signature.

FRED K. BEZZENBERGER.